United States Patent
Byun et al.

(10) Patent No.: US 10,560,838 B2
(45) Date of Patent: Feb. 11, 2020

(54) METHOD AND APPARATUS FOR DELETING UE INFORMATION BY SINGLE BASE STATION

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 119 days.

(21) Appl. No.: 15/741,109

(22) PCT Filed: Jul. 4, 2016

(86) PCT No.: PCT/KR2016/007187
§ 371 (c)(1),
(2) Date: Dec. 29, 2017

(87) PCT Pub. No.: WO2017/007202
PCT Pub. Date: Jan. 12, 2017

(65) Prior Publication Data
US 2018/0199187 A1 Jul. 12, 2018

Related U.S. Application Data

(60) Provisional application No. 62/188,589, filed on Jul. 3, 2015.

(51) Int. Cl.
*H04W 8/22* (2009.01)
*H04W 8/14* (2009.01)
*H04W 92/10* (2009.01)

(52) U.S. Cl.
CPC .............. *H04W 8/22* (2013.01); *H04W 8/14* (2013.01); *H04W 92/10* (2013.01)

(58) Field of Classification Search
CPC ........... H04W 8/22; H04W 8/14; H04W 8/30; H04W 92/10
See application file for complete search history.

(56) References Cited

U.S. PATENT DOCUMENTS

| | | |
|---|---|---|
| 2015/0146513 A1 | 5/2015 | Zakrzewski |
| 2017/0078947 A1* | 3/2017 | Lee .................. H04W 4/90 |
| 2018/0014337 A1* | 1/2018 | Kuge ................ H04W 24/04 |

FOREIGN PATENT DOCUMENTS

| | | |
|---|---|---|
| EP | 2541833 | 1/2013 |
| WO | 2014163436 | 10/2014 |

OTHER PUBLICATIONS

TD SP-140714, 'New Study Item for Isolated E-UTRN Operation for Public Safety', Dec. 10-12, 2014, 3GPP TSG SA Meeting #66, General Dynamics UK Limited, pp. 1-6.*

(Continued)

*Primary Examiner* — Melvin C Marcelo
(74) *Attorney, Agent, or Firm* — Lee Hong Degerman Kang & Waimey

(57) ABSTRACT

Provided are a method for deleting, by a mobility management entity (MME) of a local evolved packet core (EPC), user equipment (UE) information in a wireless communication system, and an apparatus for supporting the same. The method may include: receiving a UE information delete request message from a normal base station (BS), and deleting UE information on all UEs in an area of the normal BS, wherein the local EPC is comprised in an isolated BS, the MME is comprised in the local EPC, and the normal BS comprises no local EPC.

14 Claims, 18 Drawing Sheets

(56) References Cited

OTHER PUBLICATIONS

PCT International Application No. PCT/KR2016/007187, Written Opinion of the International Searching Authority dated Sep. 23, 2016, 4 pages.
3rd Generation Partnership Project (3GPP), "Technical Specification Group Services and System Aspects; Study on architecture enhancements to support isolated Evolved Universal Terrestrial Radio Access Network(E-UTRAN) operation for public safety (Release 13)," 3GPP TR 23.797 V13.0.0, Jun. 2015, 14 pages.
3rd Generation Partnership Project (3GPP), "Technical Specification Group Radio Access Network; Evolved Universal Terrestrial Radio Access Network (E-UTRAN); S1 Application Protocol (S1AP)(Release 13)," 3GPP TS 36.413 V13.0.0, Jun. 2015, 304 pages.

* cited by examiner

METHOD AND APPARATUS FOR DELETING UE INFORMATION BY SINGLE BASE STATION

CROSS-REFERENCE TO RELATED APPLICATIONS

This application is the National Stage filing under 35 U.S.C. 371 of International Application No. PCT/KR2016/007187, filed on Jul. 4, 2016, which claims the benefit of U.S. Provisional Application No. 62/188,589, filed on Jul. 3, 2015, the contents of which are all hereby incorporated by reference herein in its entirety.

BACKGROUND OF THE INVENTION

Field of the Invention

The present invention relates to a wireless communication system, and more particularly, to a method for deleting, by an MME of a local EPC, unnecessary UE information in a wireless communication system, and an apparatus supporting the same.

Related Art

An isolated base station (isolated E-UTRAN) refers to an E-UTRAN having no normal connection to an evolved packet core (EPC) or a mobile base station (nomadic eNB: NeNB) having an E-UTRAN function.

An isolated E-UTRAN operation is used when the normal backhaul connection is restricted. This operation enables a base station (BS) to operate in an isolated manner without establishing a backhaul connection in order to provide communication functions between those in charge of public safety even when a user moves out of the E-UTRAN area or a backhaul communication path is damaged. The isolated E-UTRAN operation is aimed at adapting to failure and enabling a network to maintain a permissible service level for an isolated BS. The isolated E-UTRAN operation aims ultimately at service recovery.

In recent years, there is growing interest in device-to-device (D2D) technology enabling direct communication between devices. In particular, D2D communication is attracting attention as a communication technology for public safety networks. Commercial communication networks have been rapidly changed to the LTE, whereas current public safety networks are mostly based on the 2G technology in view of cost and a collision with the existing communication standard. Considering a technological difference and a demand for enhanced services, efforts are being made to improve public safety networks.

Public safety networks have higher service requirements (reliability and security) than commercial communication networks and particularly require direct signal transmission and reception between devices, that is, a D2D operation, even outside the coverage of cellular communication or even when cellular communication is unavailable.

The D2D operation may have various advantages in terms of signal transmission and reception between adjacent devices. For example, a D2D terminal may perform data communication with high transmission rate and low delay. Further, the D2D operation may distribute traffic concentrated on a BS. When the D2D terminal functions as a relay, the D2D terminal may serve to extend the coverage of a BS.

SUMMARY OF THE INVENTION

When a backhaul between an isolated base station (BS) including a local evolved packet core (EPC) and a normal BS including no local EPC is disconnected, the isolated BS and the normal BS may operate in an isolated operation for public safety (IOPS) mode. When the backhaul between the isolated BS and the normal BS is connected again, an S1 interface between a mobility management entity (MME) of the local EPC and the normal BS may not be used any more. Accordingly, it is necessary to remove the S1 interface between the MME of the local EPC and the normal BS, which is not used. In addition, when the backhaul between the isolated BS and the normal BS is connected again, the MME of the local EPC needs to delete information on a user equipment (UE) located in the coverage of the normal BS.

Therefore, it is needed to propose a procedure for removing the S1 interface between the MME of the local EPC and the normal BS. Also, it is needed to propose a procedure for deleting the information on the UE located in the coverage of the normal BS.

According to one embodiment, there is provided a method for deleting, by an MME of a local EPC, UE information in a wireless communication system. The MME of the local EPC may include: receiving a UE information delete request message from a normal BS; and deleting UE information on all UEs in an area of the normal BS. The local EPC is included in an isolated BS, the MME is included in the local EPC, and the normal BS includes no local EPC.

When the normal BS detects the recovery of a backhaul, the UE information delete request message may be received from the normal BS.

The method may further include transmitting, by the MME of the local EPC, a UE information delete response message to the normal BS when the UE information is deleted.

The UE information delete request message may be one of a new message, an existing message, a new information element (IE) included in a new message, and a new 1E included in an existing message, and the UE information delete response message may be one of a new message, an existing message, a new IF included in a new message, and a new 1E included in an existing message.

The method may further include receiving, by the MME of the local EPC, an S1 removal request message from the normal BS.

When the normal BS detects the recovery of a backhaul, the S1 removal request message may be received from the normal BS.

The method may further include removing, by the MME of the local EPC, transport network layer (TNL) association directed to the normal BS.

The method may further include removing, by the MME of the local EPC, an S1 interface between the normal BS and the MME of the local EPC.

According to another embodiment, there is provided a method for deleting, by an MME of a local EPC, UE information in a wireless communication system. The MME of the local EPC may include: receiving a UE context release request message from a normal BS; initiating a UE context release procedure; and deleting UE information corresponding to the UE context release request message. The UE context release request message may include an S1 connection recovery indication indicating recovery of an S1 connection between a normal EPC and the normal BS, the local EPC may be included in an isolated BS, the MME may be included in the local EPC, and the normal BS may include no local EPC.

The UE context release procedure may be initiated when the MME of the local EPC transmits a UE context release command message to the normal BS.

When the MME of the local EPC receives a UE context release complete message from the normal BS, the UE information may be deleted.

The S1 connection corresponding to the UE information may be released.

According to still another embodiment, there is provided a method for removing, by an MME of a local EPC, an S1 interface between a normal BS and the MME of the local EPC in a wireless communication system. The MME of the local EPC may include: detecting recovery of an S1 connection between the normal BS and a normal EPC; transmitting an S1 removal request message to the normal BS; receiving an S1 removal response message from the normal BS; and removing transport network layer (TNL) association directed to the normal BS. The local EPC may be included in an isolated BS, the MME may be included in the local EPC, and the normal BS may include no local EPC.

The method may further include removing, by the MME of the local EPC, the S interface between the normal BS and the MME of the local EPC.

It is possible to remove UE information and an S1 interface which are unnecessary.

DESCRIPTION OF EXEMPLARY EMBODIMENTS

The technology described below can be used in various wireless communication systems, such as code division multiple access (CDMA), frequency division multiple access (FDMA), time division multiple access (TDMA), orthogonal frequency division multiple access (OFDMA), or single carrier frequency division multiple access (SC-FDMA). CDMA can be implemented with a radio technology, such as universal terrestrial radio access (UTRA) or CDMA-2000. TDMA can be implemented with a radio technology, such as global system for mobile communications (GSM)/general packet ratio service (GPRS)/enhanced data rate for GSM evolution (EDGE). OFDMA can be implemented with a radio technology, such as Institute of Electrical and Electronics Engineers (IEEE) 802.11 (Wi-Fi), IEEE 802.16 (WiMAX), IEEE 802.20, or evolved UTRA (E-UTRA). IEEE 802.16m has evolved from IEEE 802.16e and provides backward compatibility with a system based on IEEE 802.16e. UTRA is a part of a universal mobile telecommunication system (UMTS). Third generation partnership project (3GPP) long-term evolution (LTE) is a part of evolved UMTS (E-UMTS) using E-UTRA. 3GPP LTE uses OFDMA for a downlink and uses SC-FDMA for an uplink. LTE-advanced (LTE-A) is an evolution of 3GPP LTE.

For clarity, the following description will focus on LTE-A. However, technical features of the present invention are not limited thereto.

Figure 1:
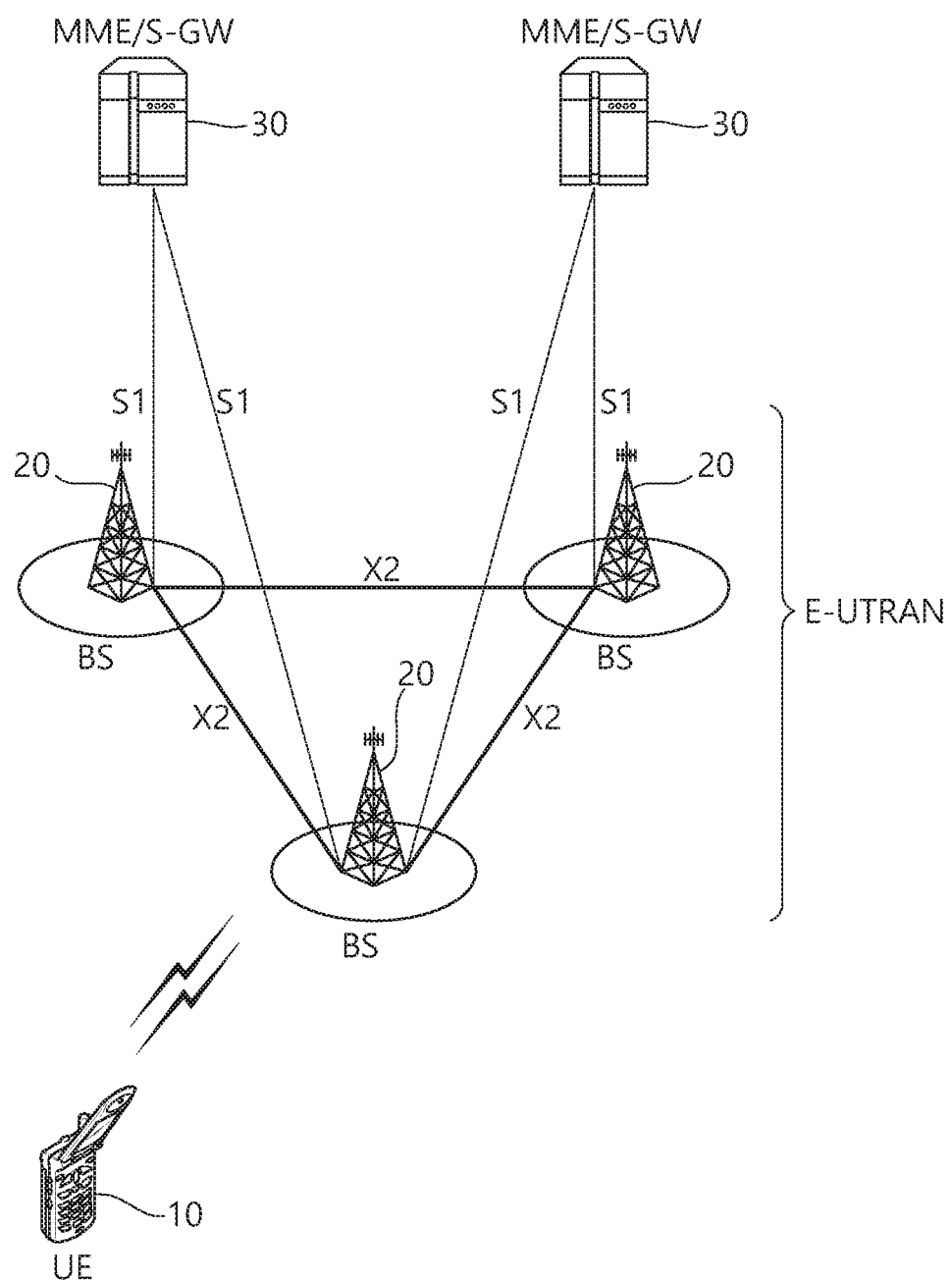
FIG. 1 shows LTE system architecture.

FIG. 1 shows LTE system architecture. A communication network is widely deployed to provide a variety of communication services, such as Voice over Internet Protocol (VoIP) through IMS and packet data.

Referring to FIG. 1, the LTE system architecture includes one or more user equipment (UE) 10, an evolved-UMTS terrestrial radio access network (E-UTRAN), and an evolved packet core (EPC). The UE 10 refers to a communication device carried by a user. The UE 10 may be stationary or mobile and may be referred to as another term, such as a mobile station (MS), a user terminal (UT), a subscriber station (SS), or a wireless device.

The E-UTRAN may include one or more evolved nodes-B (eNBs) 20, and a plurality of UEs may be located in one cell. The eNB 20 provides an end point of each of a control plane and a user plane to the UE 10. The eNB 20 generally refers to a fixed station that communicates with the UE 10 and may be referred to as another term, such as a base station (BS), a base transceiver system (BTS), or an access point. A single eNB 20 may be deployed per cell. There are one or more cells within the coverage of the eNB 20. A single cell may be configured to have one bandwidth selected from among 1.25, 2.5, 5, 10, and 20 MHz and may provide downlink (DL) or uplink (UL) transmission services to a plurality of UEs. In this case, different cells may be configured to provide different bandwidths.

Hereinafter, DL denotes communication from the eNB 20 to the UE 10, and UL denotes communication from the UE 10 to the eNB 20. In DL, a transmitter may be a part of the eNB 20, and a receiver may be a part of the UE 10. In UL, a transmitter may be a part of the UE 10, and a receiver may be a part of the eNB 20.

The EPC may include a mobility management entity (MME) that functions as a control plane and a system architecture evolution (SAE) gateway (S-GW) that functions as a user plane. The MME/S-GW 30 may be positioned at the end of the network and is connected to an external network. The MME has UE access information or UE capability information, which may be used mainly for UE mobility management. The S-GW is a gateway of which an endpoint is an E-UTRAN. The MME/S-GW 30 provides the UE 10 with an end point of a session and a mobility management function. The EPC may further include a packet data network (PDN) gateway (PDN-GW). The PDN-GW is a gateway of which an endpoint is a PDN.

The MME provides a variety of functions including non-access stratum (NAS) signaling to eNBs 20, NAS signaling security, access stratum (AS) security control, inter core network (CN) node signaling for mobility between 3GPP access networks, idle-mode UE reachability (including control and execution of paging retransmission), tracking area list management (for a UE in an idle or active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS, which includes earthquake and tsunami warning system (ETWS) and commercial mobile alert system (CMAS)) message transmission. An S-GW host provides assorted functions including per-user based packet filtering (for example, by deep packet inspection), lawful interception, UE Internet Protocol (IP) address allocation, transport-level packet marking in DL, UL and DL service level charging, gating and rate enforcement, and DL rate enforcement based on APN-AMBR. For clarity, the MME/S-GW 30 will be referred to simply as a "gateway," which may include both the MME and the S-GW.

Interfaces for transmitting user traffic or control traffic may be used. The UE 10 and the eNB 20 may be connected via a Uu interface. The eNBs 20 may be interconnected via an X2 interface. Neighboring eNBs may have a meshed network structure via the X2 interface. The eNBs 20 may be connected to the EPC via an S1 interface. The eNBs 20 may be connected to the MME via an S1-MME interface and may be connected to the S-GW via an S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in an LTE active state. In the EPC, and as noted above, gateway 30 may perform functions of paging origination, LTE idle state management, ciphering of the user plane, SAE bearer control, and ciphering and integrity protection of NAS signaling.

Figure 2:
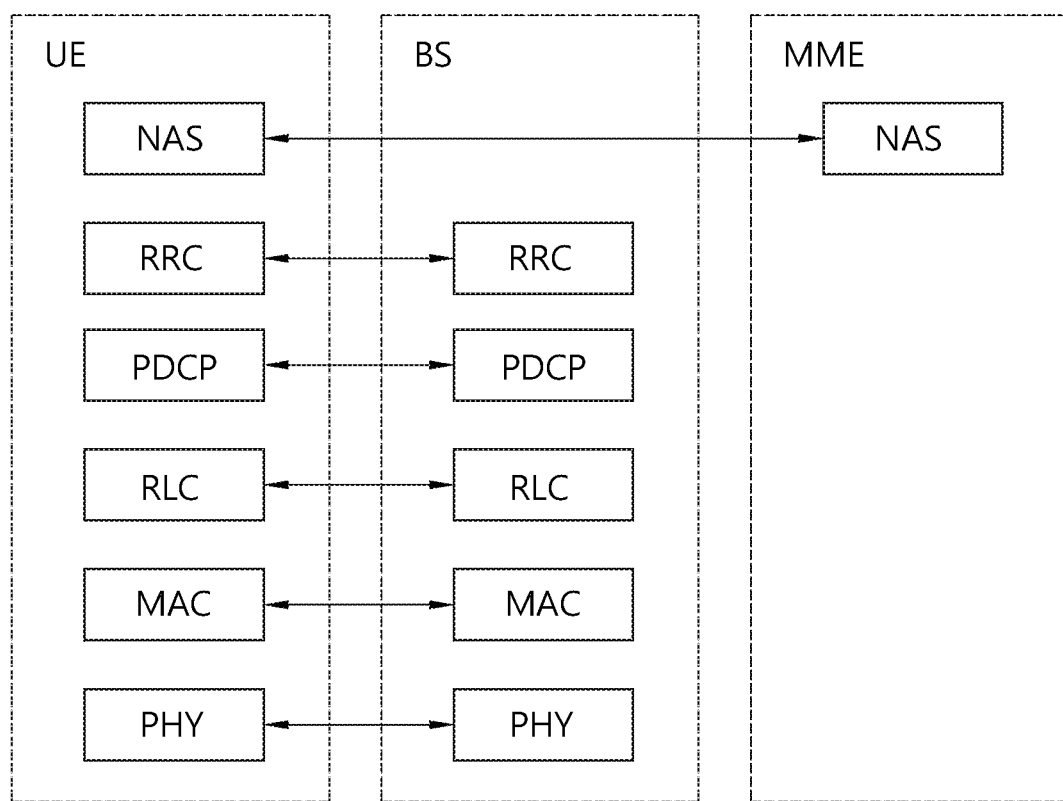
FIG. 2 shows radio interface protocols of a control plane for an LTE system.
Figure 3:
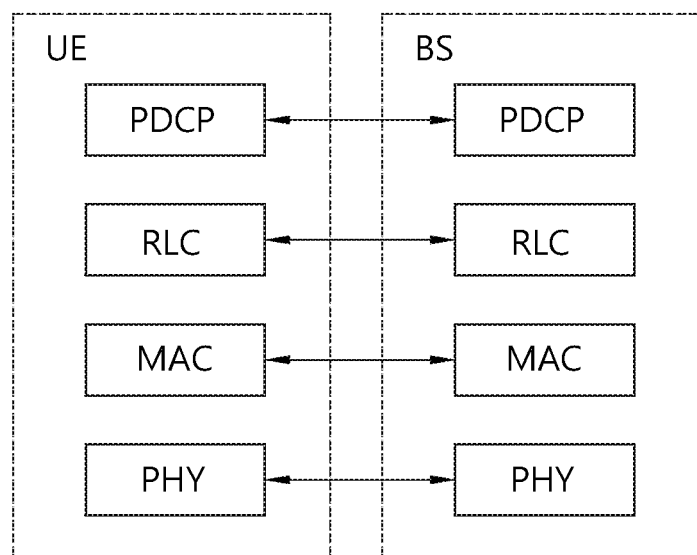
FIG. 3 shows radio interface protocols of a user plane for an LTE system.

FIG. 2 shows radio interface protocols of a control plane for an LTE system, and FIG. 3 shows radio interface protocols of a user plane for an LTE system.

Radio interface protocol layers between a UE and an E-UTRAN may be classified into a first layer (L1), a second layer (L2), and a third layer (L3) based on the lower three layers of the open system interconnection (OSI) model that is well-known in the communication system. The radio interface protocols between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocols exist in pairs at the UE and the E-UTRAN and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, that is, a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/ multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

An MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, that is, a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, that is, a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and an RRC connection procedure are described.

An RRC state indicates whether an RRC layer of the UE is logically connected to an RRC layer of the E-UTRAN. The RRC state may be divided into two different states, which are an RRC connected state (RRC_CONNECTED) and an RRC idle state (RRC_IDLE). When an RRC connection is established between the RRC layer of the UE and the RRC layer of the E-UTRAN, the UE is in RRC_CONNECTED. Otherwise, the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage the mobility of the UE in the NAS layer, two states are defined, that is, an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, that is, an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility-related procedure such as cell selection or reselection without having to receive a command of the network. On the other hand, when the UE is in the ECM-CONNECTED state, mobility of the UE is managed by the command of the network. If the location of the UE in the ECM-IDLE state becomes different from a location known to the network, the UE reports the location of the UE to the network through a tracking area update procedure.

Hereinafter, a D2D operation will be described. In 3GPP LTE-A, a service related to the D2D operation is referred to as a proximity-based service (ProSe). Hereinafter, a ProSe is conceptually equivalent to a D2D operation and may be interchangeable with a D2D operation. A ProSe is described hereinafter. A ProSe includes ProSe direct communication and ProSe direct discovery.

The ProSe direct communication refers to communication performed between two or more adjacent UEs. The UEs may perform communication using a user plane protocol. A ProSe-enabled UE means a UE supporting a process related to ProSe requirements. Unless defined otherwise, a ProSe-enabled UE includes both a public safety UE and a non-public safety UE. The public safety UE represents a UE supporting both a public safety-specific function and a ProSe process. The non-public safety UE represents a UE that supports a ProSe process but does not support a public safety-specific function.

The ProSe direct discovery is a process in which a ProSe-enabled UE discovers another ProSe-enabled UE, in which case only abilities of two ProSe-enabled UEs are used. An EPC-level ProSe discovery denotes a process in which an EPC determines whether two ProSe-enabled UEs are adjacent to each other and reports the proximity of the two ProSe-enabled UEs to each other thereto. Hereinafter, for convenience, ProSe direct communication may be referred to as D2D communication, and ProSe direct discovery may be referred to as D2D discovery.

Figure 4:
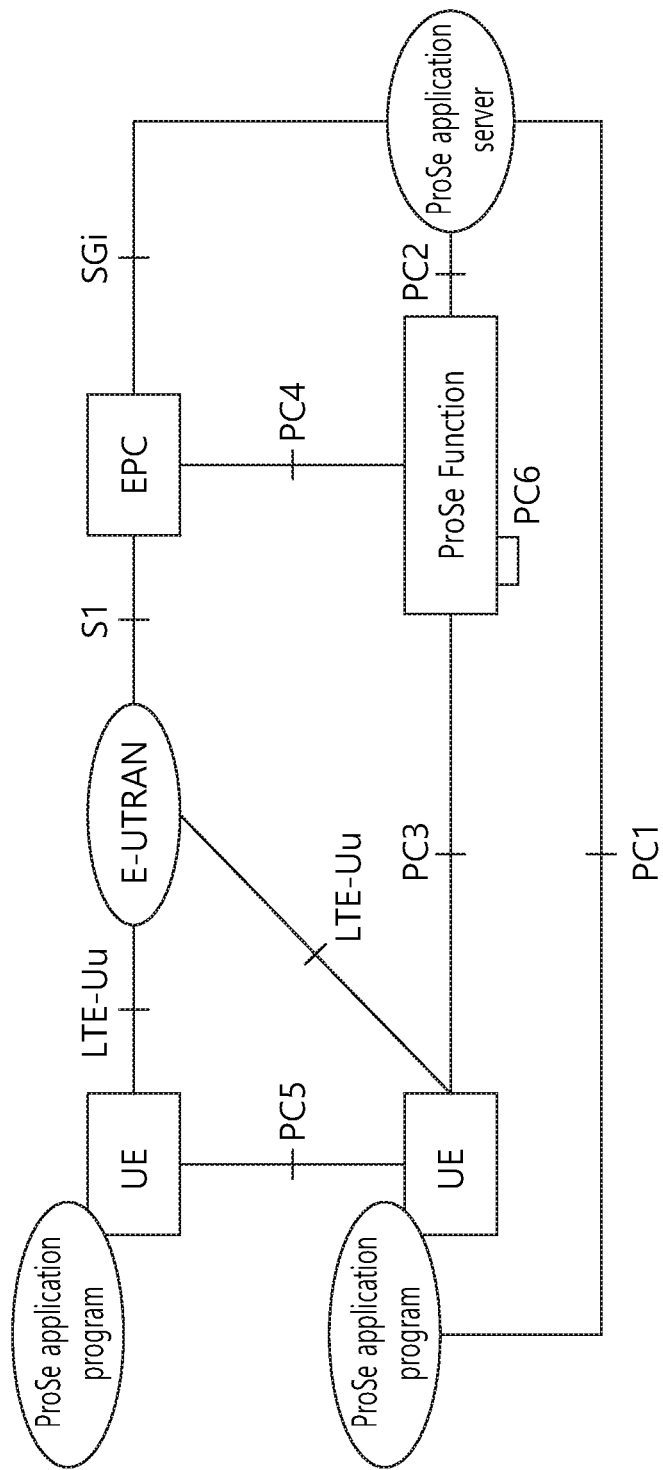
FIG. 4 shows a reference structure for a ProSe.

FIG. 4 shows a reference structure for a ProSe.

Referring to FIG. 4, the reference structure for a ProSe includes an E-UTRAN, an EPC, a plurality of UEs having a ProSe application program, a ProSe application (APP) server, and a ProSe function. The EPC represents an E-UTRAN core network structure. The EPC may include an MME, an S-GW, a P-GW, a policy and charging rules function (PCRF), and a home subscriber server (HSS). The ProSe application server is a user of ProSe capability to make an application function. The ProSe application server may communicate with an application program in a UE. The application program in the UE may use ProSe capability to make an application function.

The ProSe function may include at least one of the following functions but is not limited thereto.

Interworking via a reference point towards the 3rd party applications

Authorization and configuration of the UE for discovery and direct communication)

Enable the function of the EPC level ProSe discovery

ProSe-related new subscriber data and handling of data storage, and also handling of ProSe identities Security-related function Provide control towards the EPC for policy related function Provide function for charging (via or outside of EPC, for example, offline charging)

Hereinafter, a reference point and a reference interface in the reference structure for the ProSe will be described.

PC1: A reference point between a ProSe application program in the UE and a ProSe application program in the ProSe application server, which is used to define signaling requirements in an application level.

PC2: A reference point between the ProSe application server and the ProSe function, which is used to define an interaction between the ProSe application server and the ProSe function. The interaction may be, for example, application data updating of a ProSe database of the ProSe function.

PC3: A reference point between the UE and the ProSe function, which is used to define an interaction between the UE and the ProSe function. The interaction may be, for example, configuration for ProSe discovery and communication.

PC4: A reference point between the EPC and the ProSe function, which is used to define an interaction between the EPC and the ProSe function. The interaction may illustrate the time to set a path for 1:1 communication between UEs or the time to authorize a ProSe service for real-time session management or mobility management.

PC5: A reference point for using a control/user plane for discovery, communication, relay, and 1:1 communication between UEs.

PC6: A reference point for using a function, such as ProSe discovery between users belonging to different PLMNs.

SGi: Used for the exchange of application data and application-level control information.

Hereinafter, an isolated operation for public safety (IOPS) mode is described.

The IOPS mode may be used when backhaul failure or a traffic congestion makes it difficult for a BS to perform normal communication with an EPC. Alternatively, the IOPS mode may be employed when a mobile BS is temporarily used to secure coverage and to increase capacity. In 3GPP, the IOPS mode is broadly divided into six types.

1. To Maintain Group Call in BS

Figure 5:
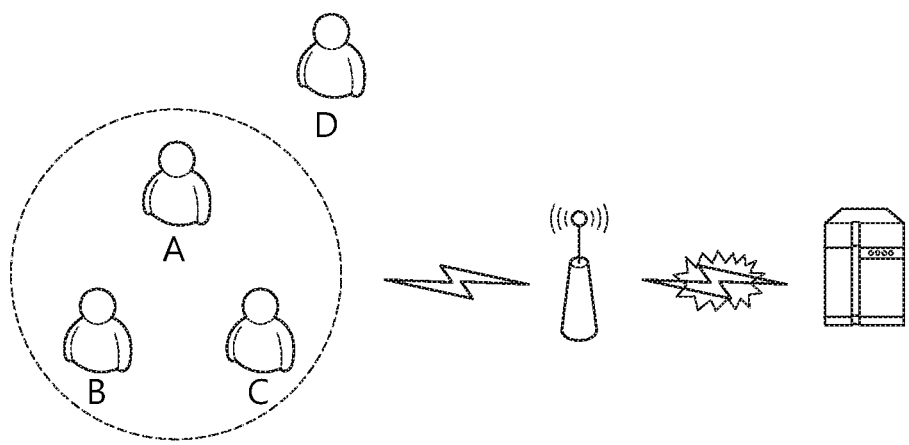
FIG. 5 shows an isolated operation for public safety (IOPS) mode for performing group communication when a backhaul is disconnected.

FIG. 5 shows an IOPS mode for performing group communication when a backhaul is disconnected.

Referring to FIG. 5, UEs may form a group (A, B, and C) in a BS and may perform a group call. In this state, when communication between the BS and an EPC is disabled, a broadband service may be disconnected. Here, the BS may report a switch to the IOPS mode to all users in the BS and may switch to a local service. Further, when a new user (D) enters the area of the BS operating as an isolated BS, the new user may identify whether the new user (D) can participate in the group call through a registration procedure with the isolated BS. Thereafter, when the BS can be connected to the EPC again, the IOPS mode is lifted and the users can switch back from the local service to the broadband service. In the scenario of maintaining the group call in the BS, the users performing the group call need to be able to continue the group call while maintaining the existing group, even though the mode is switched to the IOPS mode. Furthermore, the time to switch between the local service and the broadband service needs to be minimized so that the users can maintain the group call seamlessly and continuously.

2. To Maintain Individual Call in BS

Figure 6:
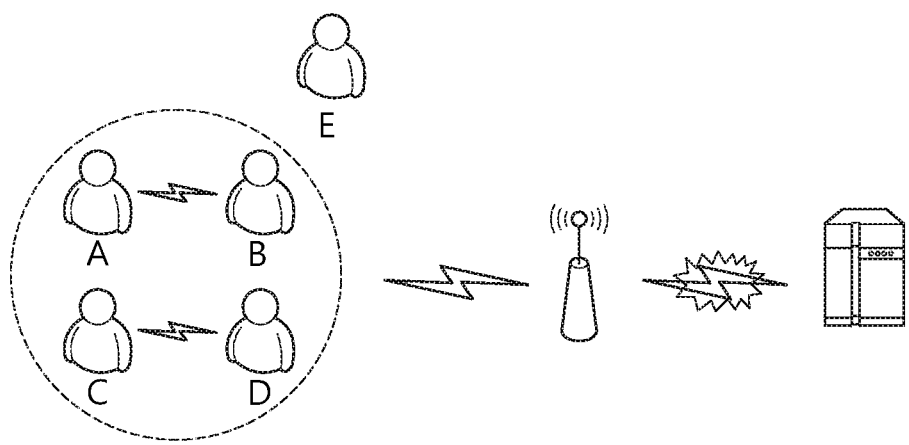
FIG. 6 shows an IOPS mode for performing individual communication when a backhaul is disconnected.

FIG. 6 shows an IOPS mode for performing individual communication when a backhaul is disconnected.

Referring to FIG. 6, when users located in the same BS perform individual calls via a broadband service, if communication between the BS and an EPC is disabled, the broadband service may be disconnected. Thus, the broadband service can be switched to a local service. When the BS is disconnected from the EPC, the broadband service for the users (A-B and C-D) making the individual calls is disconnected and the users making the individual calls recognize the switch to the IOPS mode through the BS. Thereafter, the users of the individual calls switch to the local service and perform reconnection for the individual calls through an individual call initialization process. Also, when a new user (E) is located in the BS, the new user can participate in the local service for an individual call through an authentication process with the BS operating as an isolated BS. When the BS can be connected to the EPC again, the IOPS mode is lifted and the users switch from the local service back to the broadband service.

3. Infrastructure and Mobile BS-Led Local Routing

The IOPS mode can improve coverage as a BS of an E-UTRAN supports local routing of a ProSe. When users perform a group call over an infrastructure network using a UE having a ProSe function, if a backhaul is disconnected, the BS may switch to the IOPS mode. When each user is located at a distance where the user can use a ProSe direct mode, a user who is not in network coverage may perform ProSe group communication based on the ProSe, direct mode.

4. Infrastructure and Mobile BS-Led Limited Backhaul Connection

When high-speed data transmission and reception is not smoothly achieved between a BS and a backhaul and a signaling signal and low-speed communication are possible, the BS may switch to the IOPS mode. Here, data of users is transmitted via local routing by the isolated BS, 5. IOPS Mode for Serving Wide Area (Consisting of eNB or Mobile BS)

Figure 7:
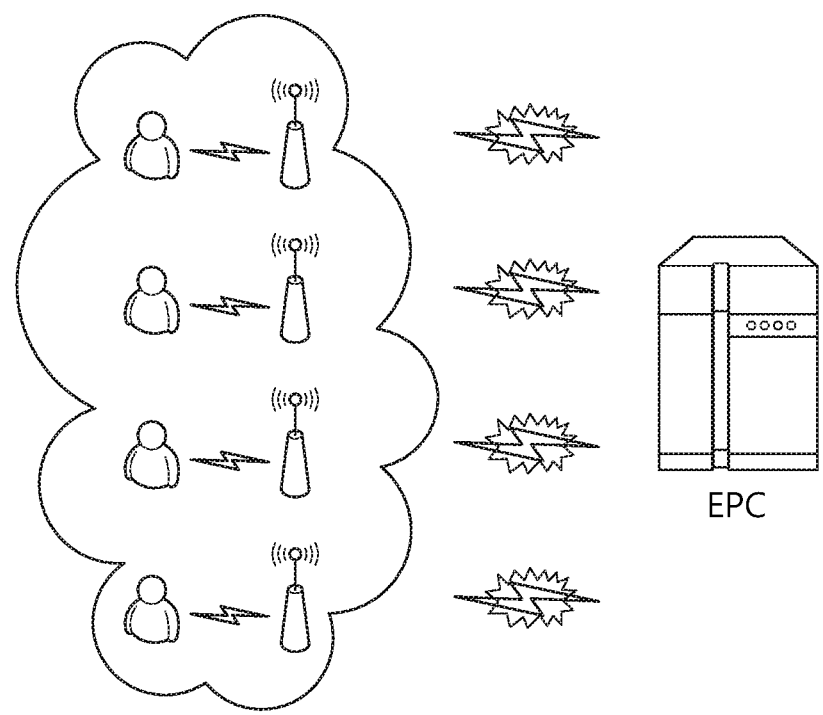
FIG. 7 shows an IOPS mode for serving a wide area.

FIG. 7 shows an IOPS mode for serving a wide area.

Referring to FIG. 7, one E-UTRAN may include a plurality of BSs. In this environment, when a backhaul connection between the E-UTRAN and an EPC is broken, all the BSs may switch to the IOPS mode. When the BSs switch to the IOPS mode while users are performing a group call over an infrastructure network using a UE having a ProSe function, group communication by a ProSe direct mode may be difficult due to a long distance between the users. In this case, the users may perform group communication through interconnections between the BSs which have switched to the IOPS mode.

6. Mobility Between Isolated BS and Normal BS

When a user is included both in the area of a BS operating in the IOPS mode and in the area of a BS normally connected to a backhaul, the user generally follows a mobility mechanism between BSs. However, in this case, it is possible to assign priority according to the BS access right by policy or to separately deal with an optimal mobility mechanism in view of resource allocation and QoS.

In the present invention, an isolated BS may be defined hereinafter as a BS including a local EPC. The local EPC may include an MME and a serving gateway (S-GW). The isolated BS may include a local EPC for the isolated BS and may provide a service using the local EPC of the isolated BS even when isolated due to a disaster or the like. In the present invention, a normal BS may be defined hereinafter as a BS including no local EPC. A normal BS may be connected to a normal EPC and may provide a service. In order to be distinguished from a local EPC, an EPC, other than a local EPC may be defined as a normal EPC.

Figure 8:
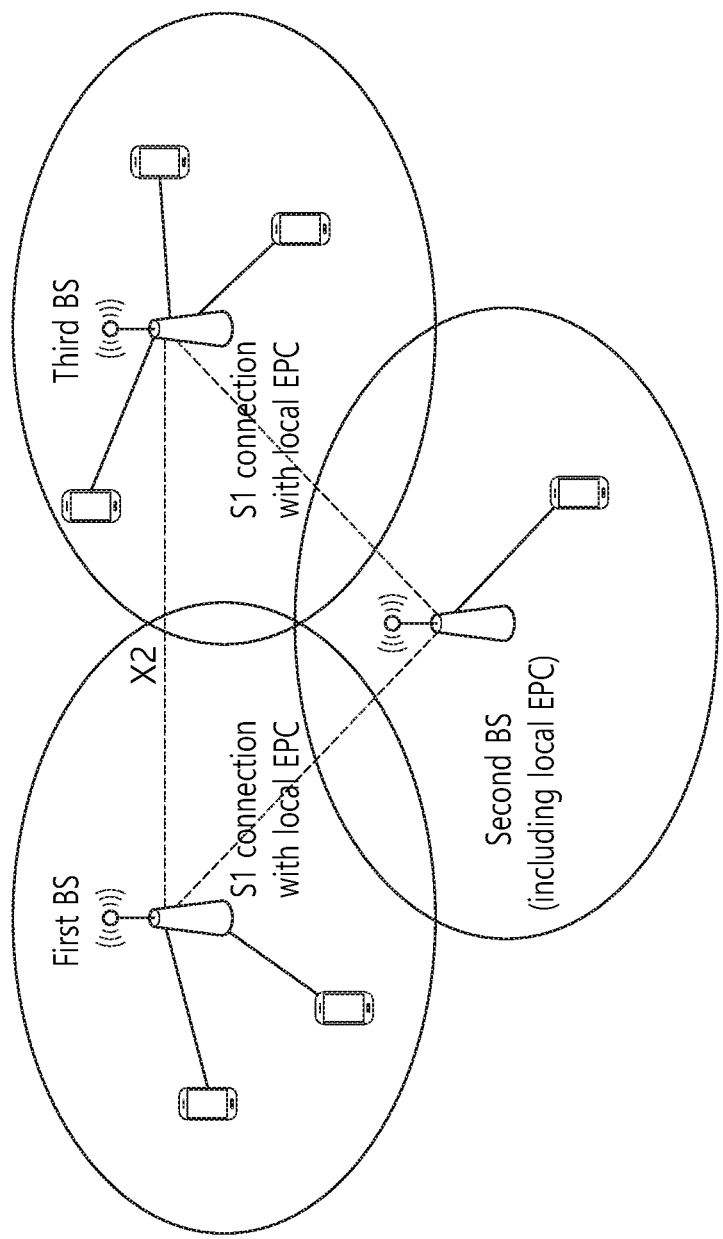
FIG. 8 shows a scenario in which a backhaul between a normal BS and an isolated BS is recovered while the normal BS is operating in the IOPS mode.

FIG. 8 shows a scenario in which a backhaul between a normal BS and an isolated BS is recovered while the normal BS is operating in the IOPS mode.

Referring to FIG. 8, a second BS is an isolated BS, and a first BS and a third BS are normal BSs. Suppose that a backhaul between the first BS and a normal EPC and a backhaul between the third BS and the normal EPC are disconnected due to a disaster. Here, since the second BS is an isolated BS including a local EPC, the first BS and the third BS may establish an S1 connection with the local EPC of the second BS and may provide a service through the S1 connection. That is, the first to third BSs are operating in the IOPS mode. Next, suppose that the backhaul between the first BS and the normal EPC is recovered. That is, suppose that the first BS and the normal EPC may be connected to each other via the S1 interface.

In this scenario, the first BS may detect that the backhaul between the first BS and the normal EPC has been recovered. As the backhaul is recovered, the first BS stops operating in the IOPS mode, and thus it is needed to remove the S1 interface between the first BS and an MME of the local EPC. However, the existing S1 release procedure includes no procedure for removing the S1 interface between the first BS and the MME of the local EPC. That is, the S1 interface between the MME of the local EPC and the first BS, which is unused, may remain. Therefore, when the backhaul is recovered, it is necessary to propose a procedure for removing the S1 interface between the first BS and the MME of the local EPC.

In this scenario, when the existing S1 release procedure is used, the MME of the local EPC retains remaining MME context of a UE in the coverage of the first BS including S1-U configuration information on the S-GW. Thus, the MME of the local EPC may need to retain unnecessary information until the local EPC is deactivated. Therefore, when the backhaul is recovered, it is necessary to propose a procedure in which the MME of the local EPC deletes unnecessary UE information.

Hereinafter, a method for removing an S1 interface between an MME of a local EPC and a normal BS and an apparatus supporting the same will be described according to an embodiment of the present invention. In addition, a method for deleting, by an MME of a local EPC, unnecessary UE information and an apparatus supporting the same will be described according to an embodiment of the present invention.

1. Method for Deleting Unnecessary UE Information

When it is detected that a backhaul has been recovered, a normal BS that is connected to a local EPC and is capable of operating in the IOPS mode may provide, to the MME of the local EPC, an instruction to delete context information on all UEs in the coverage of the normal BS. Hereinafter, a detailed description will be given with reference to FIGS. 9 and 10.

Figure 9:
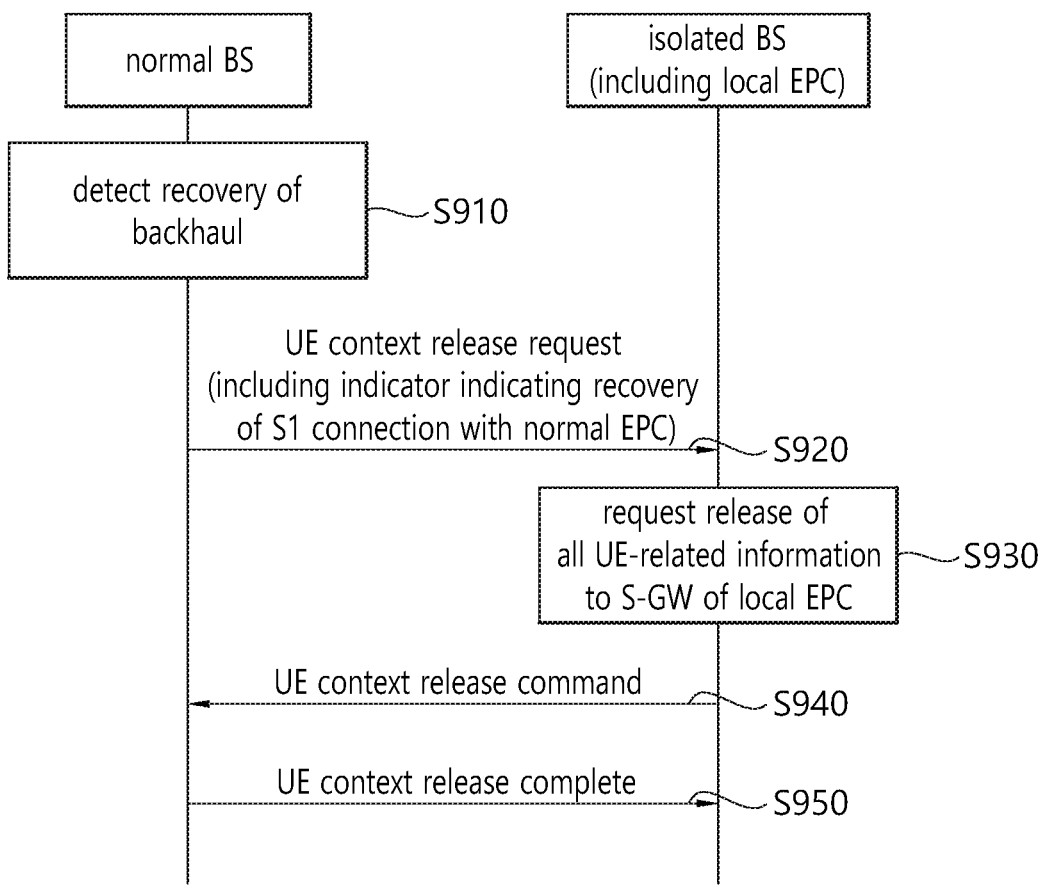
FIG. 9 shows a method for an MME of a local EPC to delete UE information according to an embodiment of the present invention.

FIG. 9 shows a method for an MME of a local EPC to delete UE information according to an embodiment of the present invention.

Referring to FIG. 9, a normal BS may detect that a backhaul between the normal BS and a normal EPC has been recovered (S910). Therefore, the normal BS may perform communication with the normal EPC via an S1 connection.

When the normal BS detects that the backhaul has been recovered, the normal BS may transmit a UE context release request message to an MME of a local EPC (S920). The local EPC may be included in an isolated BS. The UE context release request message may include an S1 connection recovery indication. The S1 connection recovery indicator may indicate that the S1 connection between the normal EPC and the normal BS is recovered. The S1 connection recovery indication may be either a cause value or a new IE.

When the MME of the local EPC receives the UE context release request message from the normal BS, the MME of the local EPC may request the release of all UE-related information to the S-GW of the local EPC (S930). The MME and the S-GW may be included in the same local EPC.

The MME of the local EPC may initiate a UE context release procedure (S940). The UE context release, procedure may be initiated when the MME of the local EPC transmits a UE context release command message to the normal BS.

The S1 connection between the MME of the local EPC and the normal BS may be released (S950). When the MME of the local EPC receives a UE context release complete message from the normal BS, the S1 connection may be released. When the MME of the local EPC receives a UE context release complete message from the normal BS, the MME of the local EPC may delete all UE-related information. A UE released from the S1 connection may be a UE corresponding to the UE context release request message. The deleted UE information may be UE information corresponding to the UE context release request message.

Figure 10:
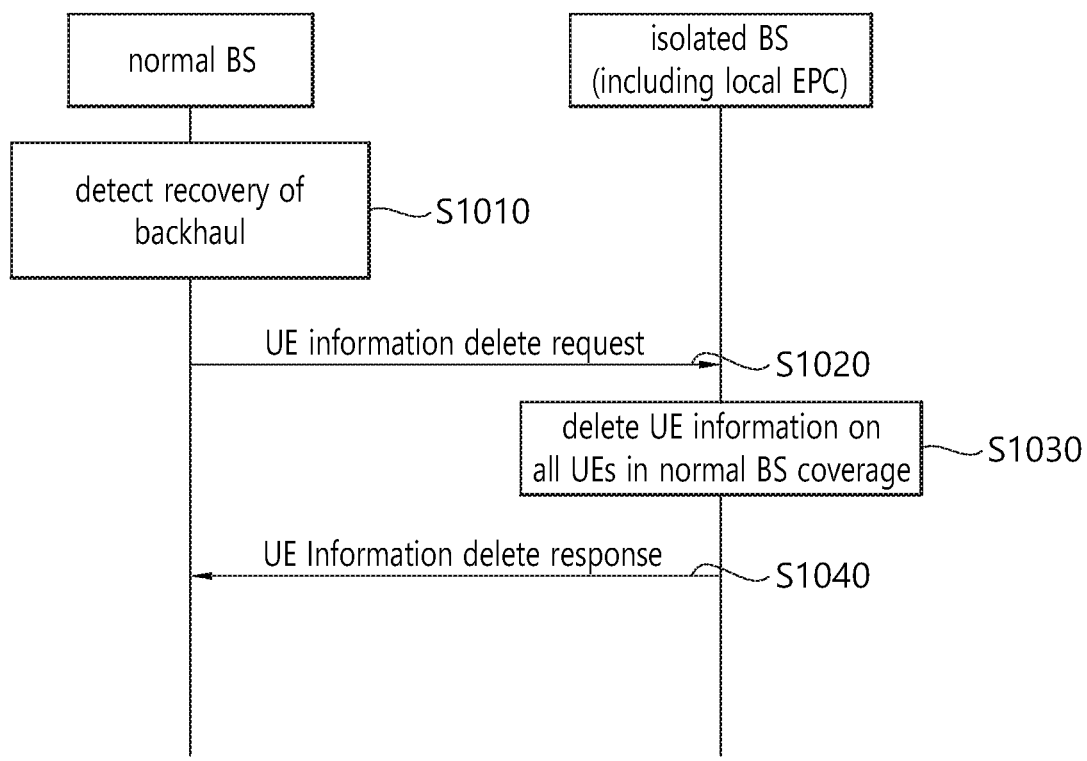
FIG. 10 shows a method for an MME of a local EPC to delete UE information according to an embodiment of the present invention.

FIG. 10 shows a method for an MME of a local EPC to delete UE information according to an embodiment of the present invention.

Referring to FIG. 10, a normal BS may detect that a backhaul between the normal BS and a normal EPC has been recovered (S1010).

When the normal BS detects that the backhaul has been recovered, the normal BS may transmit a UE information delete request message to an MME of a local EPC (S1020). The local EPC may be included in an isolated BS. The UE information delete request message may be any one of a new message, an existing message, a new IE included in a new message, and a new IE included in an existing message.

When the MIME of the local EPC receives the UE information delete request message, the MME of the local EPC may delete UE information on all UEs in the coverage of the normal BS (S1030).

The MME of the local EPC may transmit a UE Information delete response message to the normal BS (S1040). The UE information delete response message may be any one of a new message, an existing message, a new IE included in a new message, and a new IE included in an existing message.

According to the embodiment of FIG. 9, the MME of the local EPC may release an S1 connection with respect each terminal. On the other hand, according to the embodiment of FIG. 10, the MME of the local EPC may release an S1 connection with respect to all UEs within the coverage of the normal BS.

2. Method for removing S1 interface between MME of local EPC and normal BS

When it is detected that a backhaul has been recovered, an S1 interface between an MME of a local EPC and a normal BS needs to be removed. The S1 interface may be removed by the normal BS. Alternatively, the S1 interface may be removed by an isolated BS. Alternatively, the S1 interface may be removed by a BS that detects that the backhaul has been recovered. Hereinafter, a detailed description will be given with reference to FIGS. 11 to 14.

Figure 11:
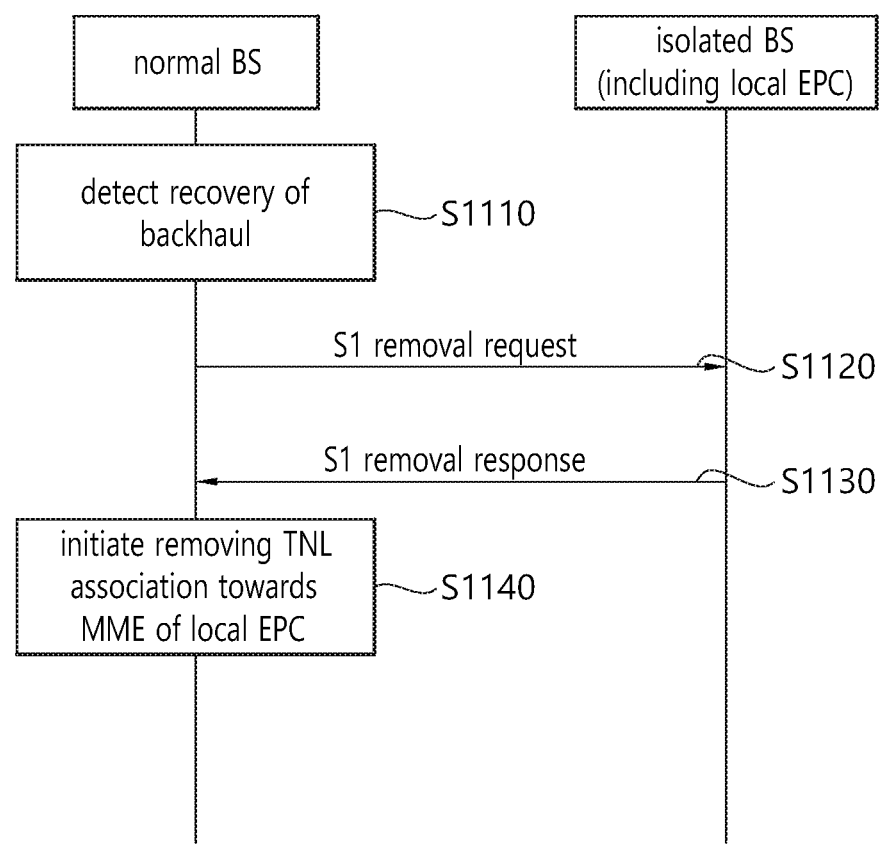
FIG. 11 shows a method for a normal BS to remove an S1 interface between an MME of a local EPC and the normal BS according to an embodiment of the present invention.

FIG. 11 shows a method for a normal BS to remove an S1 interface between an MME of a local EPC and the normal BS according to an embodiment of the present invention.

Referring to FIG. 11, a normal BS may detect that a backhaul between the normal BS and a normal EPC has been recovered (S1110).

When the normal BS detects that the backhaul has been recovered, the normal BS may transmit an S1 removal request message to the MME of the local EPC (S1120). The local EPC may be included in an isolated BS.

When the MIME of the local EPC receives the S1 removal request message, the MME of the local EPC may transmit an S1 removal response message to the normal BS in response to the S1 removal request message (S1130).

When the normal BS receives the S1 removal response message, the normal BS may initiate removing transport network layer (TNL) association directed to the MME of the local EPC (S1140). Further, the normal BS may remove all resources associated with a corresponding signaling connection. Accordingly, an S1 interface between the MME of the local EPC and the normal BS may be removed.

Figure 12:
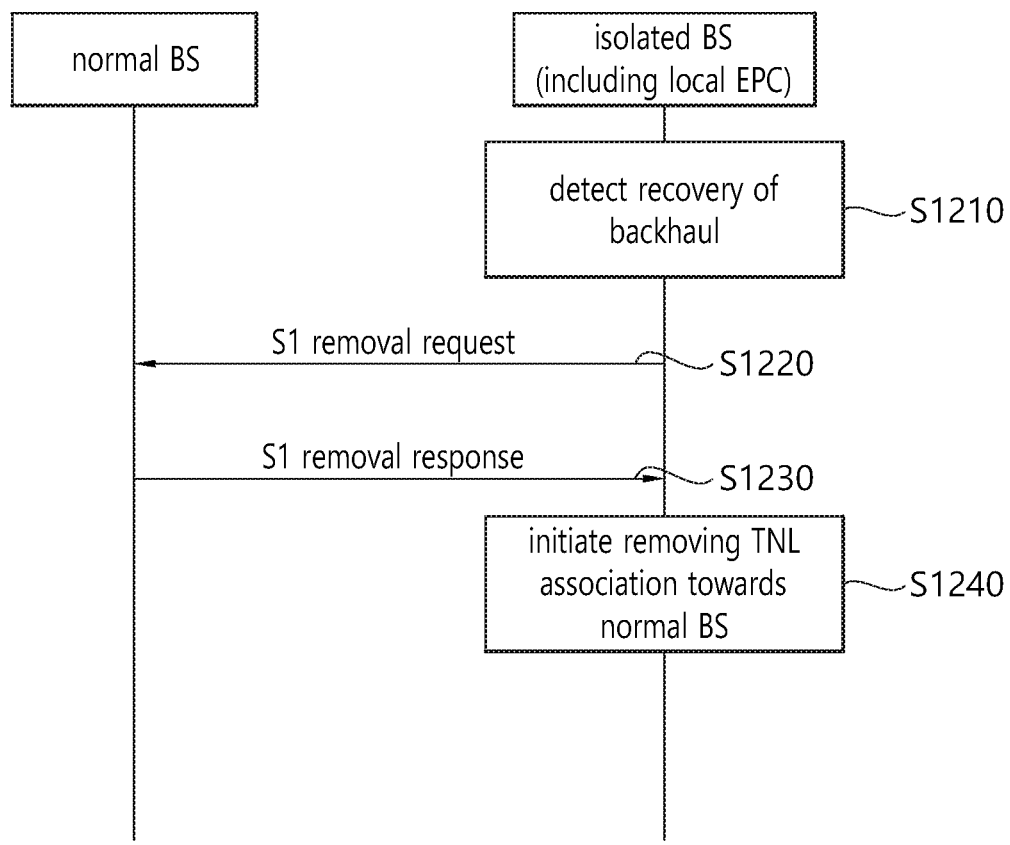
FIG. 12 shows a method for an MME of a local EPC to remove an S1 interface between the MME of the local EPC and a normal BS according to an embodiment of the present invention.

FIG. 12 shows a method for an MME of a local EPC to remove an S1 interface between the MME of the local EPC and a normal BS according to an embodiment of the present invention.

Referring to FIG. 12, an MME of a local EPC may detect that a backhaul between a normal BS and a normal EPC has been recovered (S1210). The local EPC may be included in an isolated BS.

When the MME of the local EPC detects that the backhaul has been recovered, the MME of the local EPC may transmit an S1 removal request message to the normal BS (S1220).

When the normal BS receives the S1 removal request message, the normal BS may transmit an S1 removal response message to the MME of the local EPC in response to the S1 removal request message (S1230).

When the MME of the local EPC receives the S1 removal response message, the MME of the local EPC may initiate removing TNL association directed to the normal BS (S1240). Further, the MME of the local EPC may remove all resources associated with a corresponding signaling connection. Accordingly, an S1 interface between the MME of the local EPC and the normal BS may be removed.

Figure 13:
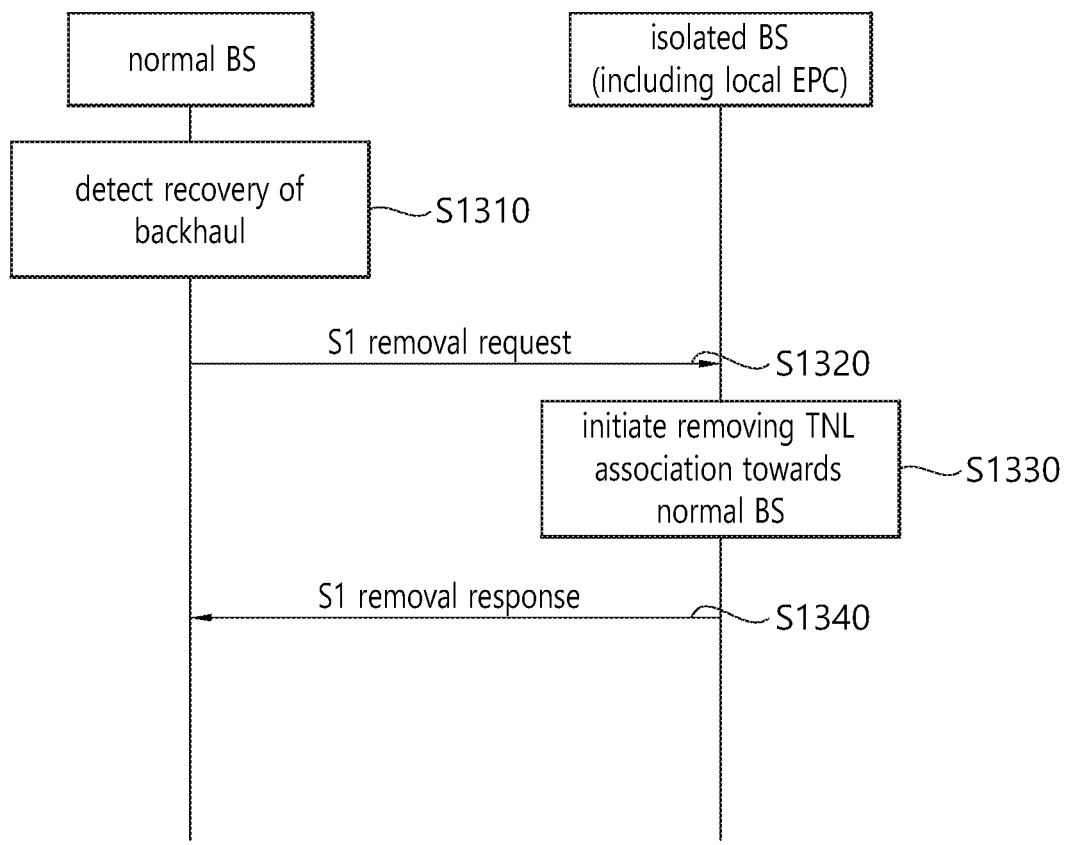
FIG. 13 shows a method for an MME of a local EPC to remove an S1 interface between the MME of the local EPC and a normal BS according to an embodiment of the present invention.

FIG. 13 shows a method for an MME of a local EPC to remove an S1 interface between the MME of the local EPC and a normal BS according to an embodiment of the present invention.

Referring to FIG. 13 a normal BS may detect that a backhaul between the normal BS and a normal EPC has been recovered (S1310).

When the normal BS detects that the backhaul has been recovered, the normal BS may transmit an S1 removal request message to the MME of the local EPC (S1320). The local EPC may be included in an isolated BS.

When the MME of the local EPC receives the S1 removal request message, the MME of the local EPC may initiate removing TNL association directed to the normal BS (S1330). Further, the MME of the local EPC may remove all resources associated with a corresponding signaling connection. Accordingly, an S1 interface between the MME of the local EPC and the normal BS may be removed.

The MME of the local EPC may transmit an S1 removal response message to the normal BS in response to the S1 removal request message (S1340). Upon receiving the S1 response message, the normal BS may recognize that the S1 interface between the MME of the local EPC and the normal BS has been removed. However, the S1 removal response message may be transmitted before the MME of the local EPC starts removing TNL association directed to the normal BS.

Figure 14:
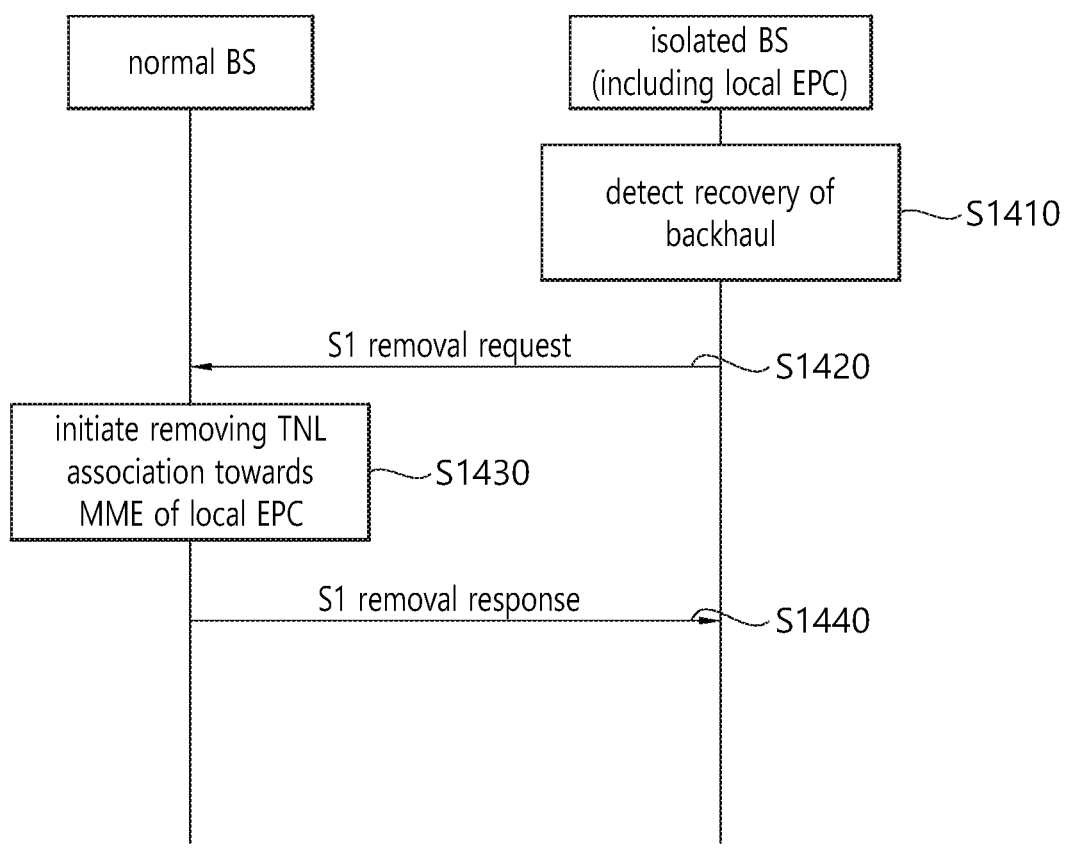
FIG. 14 shows a method for a normal BS to remove an S1 interface between an MME of a local EPC and the normal BS according to an embodiment of the present invention.

FIG. 14 shows a method for a normal BS to remove an S1 interface between an MME of a local EPC and the normal BS according to an embodiment of the present invention.

Referring to FIG. 14, an MME of a local EPC may detect that a backhaul between a normal BS and a normal EPC has been recovered (S1410). The local EPC may be included in an isolated BS.

When the MME of the local EPC detects that the backhaul has been recovered, the MME of the local EPC may transmit an S1 removal request message to the normal BS (S1420).

When the normal BS receives the S1 removal request message, the normal BS may initiate removing TNL association directed to the MME of the local EPC (S1430). Further, the normal BS may remove all resources associated with a corresponding signaling connection. Accordingly, an S1 interface between the MME of the local EPC and the normal BS may be removed.

The normal BS may transmit an S1 removal response message to the MME of the local EPC in response to the S1 removal request message (S1440). Upon receiving the S response message, the MME of the local EPC may recognize that the S1 interface between the MME of the local EPC and the normal BS has been removed. However, the S1 removal response message may be transmitted before the normal BS starts removing TNL association directed to the MME of the local EPC.

Figure 15:
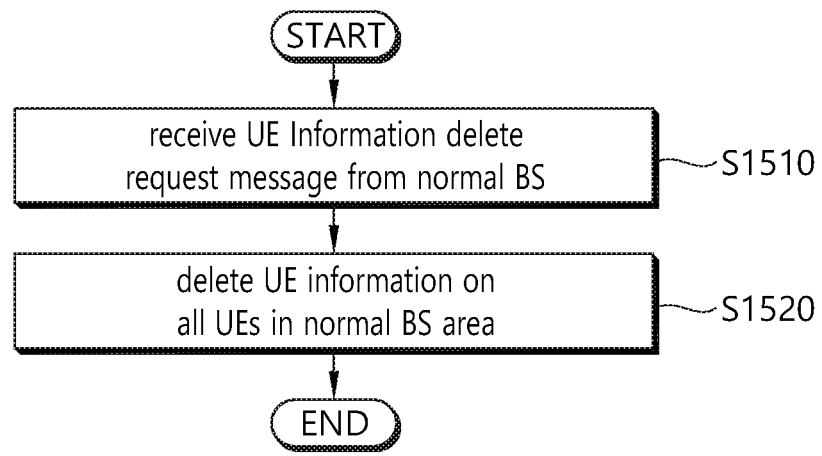
FIG. 15 is a block diagram showing a method for an MME of a local EPC to delete UE information according to an embodiment of the present invention.

FIG. 15 is a block diagram showing a method for an MME of a local EPC to delete UE information according to an embodiment of the present invention.

Referring to FIG. 15, an MME of a local EPC may receive a UE Information delete request message from a normal BS (S1510). The local EPC may be included in an isolated BS, and the MME may be included in the local EPC. The normal BS includes no local EPC. When the normal BS detects the recovery of a backhaul, the UE information delete request message may be received from the normal BS. The UE information delete request message may be any one of a new message, an existing message, a new IE included in a new message, and a new IE included in an existing message.

The MME of the local EPC may delete UE information on all UEs in the area of the normal BS (S1520).

When the UE information is deleted, the MME of the local EPC may transmit a UE information delete response message to the normal BS. The UE information delete response message may be any one of a new message, an existing message, a new IE included in a new message, and a new IE included in an existing message.

The MME of the local EPC may receive an S1 removal request message from the normal BS. When the normal BS detects the recovery of the backhaul, the S1 removal request message may be received from the normal BS.

The MME of the local EPC may remove TNL association directed to the normal BS. Also, the MME of the local EPC may remove an S1 interface between the normal BS and the MME of the local EPC.

Figure 16:
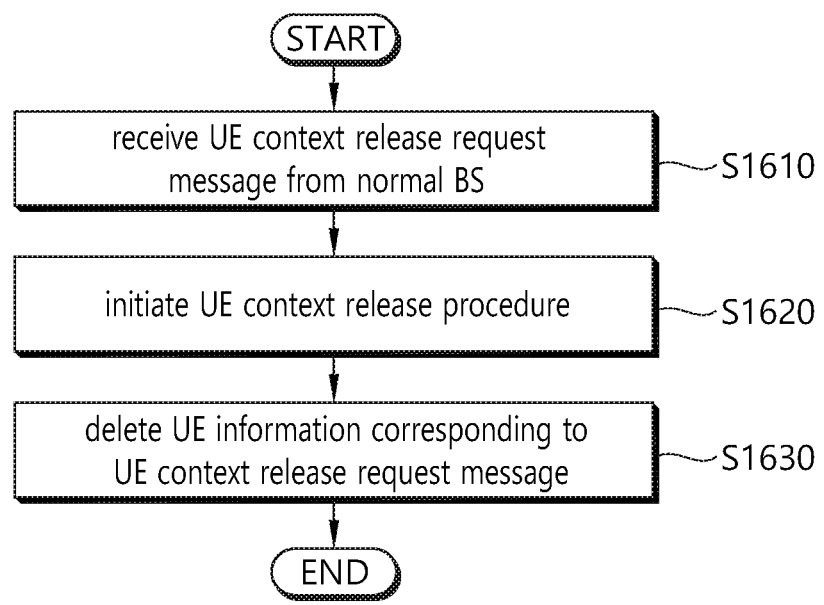
FIG. 16 is a block diagram showing a method for an MME of a local EPC to delete UE information according to an embodiment of the present invention.

FIG. 16 is a block diagram showing a method for an MME of a local EPC to delete UE information according to an embodiment of the present invention.

Referring to FIG. 16, an MME of a local EPC may receive a UE context release request message from a normal BS (S1610). The UE context release request message may include an S1 connection recovery indication indicating the recovery of an S1 connection between a normal EPC and the normal BS. The local EPC may be included in an isolated BS, and the MME may be included in the local EPC. The normal BS includes no local EPC.

The MME of the local EPC may initiate a UE context release procedure (S1620). The UE context release procedure may be initiated when the MME of the local EPC transmits a UE context release command message to the normal BS.

The MME of the local EPC may delete UE information corresponding to the UE context release request message (S1630). When the MME of the local EPC receives a UE context release complete message from the normal BS, the UE information may be deleted. The S1 connection corresponding to the UE information may be released.

Figure 17:
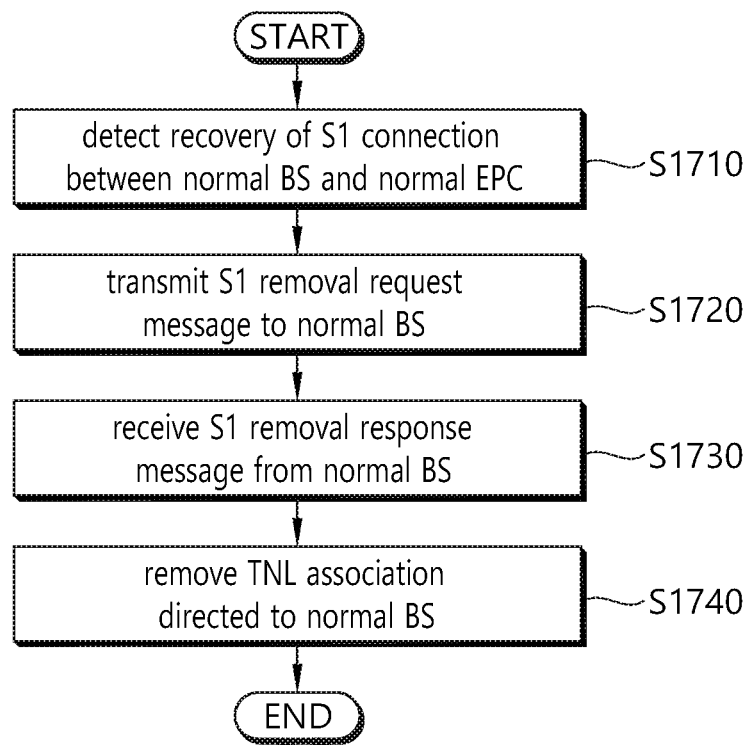
FIG. 17 is a block diagram showing a method for an MME of a local EPC to remove an S1 interface between a normal BS and the local EPC according to an embodiment of the present invention.

FIG. 17 is a block diagram showing a method for an MME of a local EPC to remove an S1 interface between a normal BS and the local EPC according to an embodiment of the present invention.

Referring to FIG. 17, an MME of a local EPC may detect the recovery of an S1 connection between a normal BS and a normal EPC (S1710). The local EPC may be included in an isolated BS, and the MME may be included in the local EPC. The normal BS includes no local EPC.

The MME of the local EPC may transmit S1 removal request message to the normal BS (S1720).

The MME of the local EPC may receive an S1 removal response message from the normal BS (S1730).

The MME of the local EPC may remove TNL association directed to the normal BS (S1740).

The MME of the local EPC may remove an S1 interface between the normal BS and the MME of the local EPC.

Figure 18:
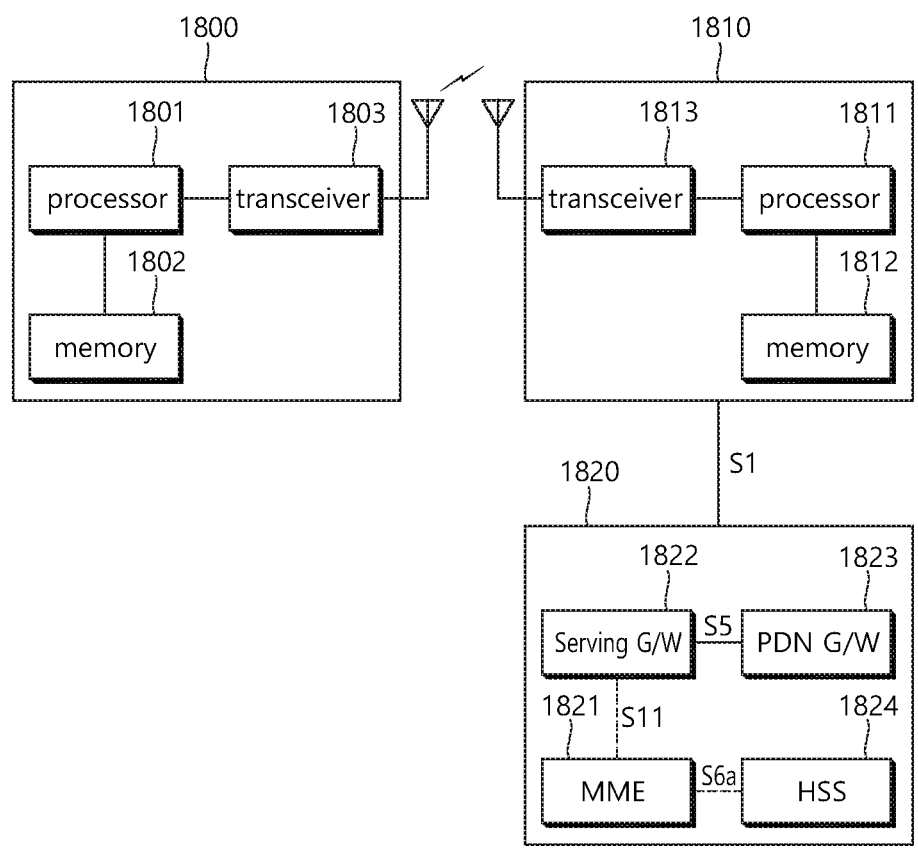
FIG. 18 is a block diagram illustrating a wireless communication system in which the embodiments are implemented.

FIG. 18 is a block diagram illustrating a wireless communication system in which the embodiments are implemented.

A normal BS 1800 includes a processor 1801, a memory 1802, and a transceiver 1803. The memory 1802 is connected to the processor 1801 and stores various pieces of information to drive the processor 1801. The transceiver 1803 is connected to the processor 1801 and transmits and/or receives radio signals. The processor 1801 implements proposed functions, processes, and/or methods. In the aforementioned embodiments, the operation of the normal BS may be implemented by the processor 1801.

An isolated BS 1810 includes a processor 1811, a memory 1812, and a transceiver 1813. The isolated BS 1810 includes a local EPC 1820. The local EPC 1820 includes an MME 1821, a serving G/W 1822, a PDN G/W 1823, and an HSS 1824. The memory 1812 is connected to the processor 1811 and stores various pieces of information to drive the processor 1811. The transceiver 1813 is connected to the processor 1811 and transmits and/or receives radio signals. The processor 1811 implements proposed functions, processes, and/or methods. In the aforementioned embodiments, the operation of the isolated BS may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (that is, process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for deleting, by a mobility management entity (MME) of a local evolved packet core (EPC), user equipment (UE) information in a wireless communication system, the method comprising:
    receiving a UE information delete request message from a normal base station (BS); and
    deleting UE information on all UEs in an area of the normal BS,
    wherein the local EPC is comprised in an isolated BS, the MME is comprised in the local EPC, and the normal BS comprises no local EPC.

2. The method of claim 1, wherein when the normal BS detects recovery of a backhaul, the UE information delete request message is received from the normal BS.

3. The method of claim 2, further comprising transmitting, by the MME of the local EPC, a UE information delete response message to the normal BS when the UE information is deleted.

4. The method of claim 3, wherein the UE information delete request message is one of a new message, an existing message, a new information element (IE) comprised in a new message, and a new IE comprised in an existing message, and
    wherein the UE information delete response message is one of a new message, an existing message, a new IE comprised in a new message, and a new IE comprised in an existing message.

5. The method of claim 1, further comprising receiving, by the MME of the local EPC, an S1 removal request message from the normal BS.

6. The method of claim 5, wherein when the normal BS detects recovery of a backhaul, the S1 removal request message is received from the normal BS.

7. The method of claim 5, further comprising removing, by the MME of the local EPC, transport network layer (TNL) association directed to the normal BS.

8. The method of claim 7, further comprising removing, by the MME of the local EPC, an S1 interface between the normal BS and the MME of the local EPC.

9. A method for deleting, by a mobility management entity (MME) of a local evolved packet core (EPC), user equipment (UE) information in a wireless communication system, the method comprising:
　receiving a UE context release request message from a normal base station (BS);
　initiating a UE context release procedure; and
　deleting UE information corresponding to the UE context release request message,
　wherein the UE context release request message comprises an S1 connection recovery indication indicating recovery of an S1 connection between a normal EPC and the normal BS, and
　wherein the local EPC is comprised in an isolated BS, the MME is comprised in the local EPC, the normal BS comprises no local EPC, and the normal EPC is an EPC other than the local EPC comprised in the isolated BS.

10. The method of claim 9, wherein the UE context release procedure is initiated when the MME of the local EPC transmits a UE context release command message to the normal BS.

11. The method of claim 10, wherein when the MME of the local EPC receives a UE context release complete message from the normal BS, the UE information is deleted.

12. The method of claim 11, wherein the S1 connection corresponding to the UE information is released.

13. A method for removing, by a mobility management entity (MME) of a local evolved packet core (EPC), an S1 interface between a normal base station (BS) and the MME of the local EPC in a wireless communication system, the method comprising:
　detecting recovery of an S1 connection between the normal BS and a normal EPC;
　transmitting an S1 removal request message to the normal BS;
　receiving an S1 removal response message from the normal BS; and
　removing transport network layer (TNL) association directed to the normal BS,
　wherein the local EPC is comprised in an isolated BS, the MME is comprised in the local EPC, the normal BS comprises no local EPC, and the normal EPC is an EPC other than the local EPC comprised in the isolated BS.

14. The method of claim 13, further comprising removing, by the MME of the local EPC, the S1 interface between the normal BS and the MME of the local EPC.

* * * * *